(12) United States Patent  (10) Patent No.: US 7,410,119 B2
Leon et al.  (45) Date of Patent: Aug. 12, 2008

(54) ROTATING MISSILE EMITTING LIGHT PULSES

(75) Inventors: Fabienne Leon, Antony (FR); Bernard Teneze, Trouy (FR); Franck Bernoux, L'Hay-les-Roses (FR)

(73) Assignee: MBDA France, Paris (FR)

( * ) Notice: Subject to any disclaimer, the term of this patent is extended or adjusted under 35 U.S.C. 154(b) by 336 days.

(21) Appl. No.: 10/558,741

(22) PCT Filed: Jul. 1, 2004

(86) PCT No.: PCT/FR2004/001691

§ 371 (c)(1),
(2), (4) Date: Dec. 1, 2005

(87) PCT Pub. No.: WO2005/012824

PCT Pub. Date: Feb. 10, 2005

(65) Prior Publication Data

US 2006/0255204 A1  Nov. 16, 2006

(30) Foreign Application Priority Data

Jul. 4, 2003  (FR) .................................. 03 08183

(51) Int. Cl.
*F41G 7/30* (2006.01)
*F41G 7/00* (2006.01)
*F42B 15/00* (2006.01)

(52) U.S. Cl. ..................... 244/3.11; 244/3.1; 244/3.13

(58) Field of Classification Search ........... 244/3.1–3.3; 235/400–418; 356/614–624, 138–152.3
See application file for complete search history.

(56) References Cited

U.S. PATENT DOCUMENTS

| 3,642,233 | A | * | 2/1972 | Bezerie | 244/3.16 |
| 3,820,742 | A | * | 6/1974 | Watkins | 244/3.11 |
| 4,027,837 | A | * | 6/1977 | Miller et al. | 244/3.16 |
| 4,202,515 | A | * | 5/1980 | Maxwell, Jr. | 244/3.11 |
| 4,247,059 | A | * | 1/1981 | Duke et al. | 244/3.16 |
| 4,424,943 | A | * | 1/1984 | Zwirn et al. | 244/3.11 |
| 4,666,103 | A | * | 5/1987 | Allen | 244/3.11 |
| H000299 | H | * | 7/1987 | Miller, Jr. | 244/3.13 |
| 4,710,028 | A | | 12/1987 | Grenier et al. | |
| 4,728,057 | A | * | 3/1988 | Dunne | 244/3.16 |
| RE33,287 | E | * | 8/1990 | Allen | 244/3.11 |
| 4,951,901 | A | * | 8/1990 | Dunne | 244/3.23 |
| 5,081,345 | A | * | 1/1992 | Grenier et al. | 356/141.5 |
| 5,163,637 | A | * | 11/1992 | Hansen | 244/3.21 |
| 5,848,763 | A | * | 12/1998 | Mitchell et al. | 244/3.11 |

(Continued)

FOREIGN PATENT DOCUMENTS

DE  4110766  10/1992

(Continued)

OTHER PUBLICATIONS

PCT International Search Report dated Jan. 19, 2005.

*Primary Examiner*—Bernarr E Gregory
(74) *Attorney, Agent, or Firm*—Dickinson Wright, PLLC

(57) ABSTRACT

The invention concerns a rotating missile emitting light pulses. The invention is characterized in that means are provided to interrupt said light pulses (5) when the rotational movement (3) of the missile (2) about its longitudinal axis (L-L) stops.

9 Claims, 2 Drawing Sheets

| U.S. PATENT DOCUMENTS | | | | |
|---|---|---|---|---|
| 6,076,765 A | * | 6/2000 | Horwath | 244/3.16 |
| 6,260,792 B1 | * | 7/2001 | Zwirn et al. | 244/3.11 |
| 6,357,695 B1 | * | 3/2002 | Horwath | 244/3.16 |

| FOREIGN PATENT DOCUMENTS | | | |
|---|---|---|---|
| GB | 2074808 A | * | 11/1981 |
| WO | 8303894 | | 11/1983 |

* cited by examiner

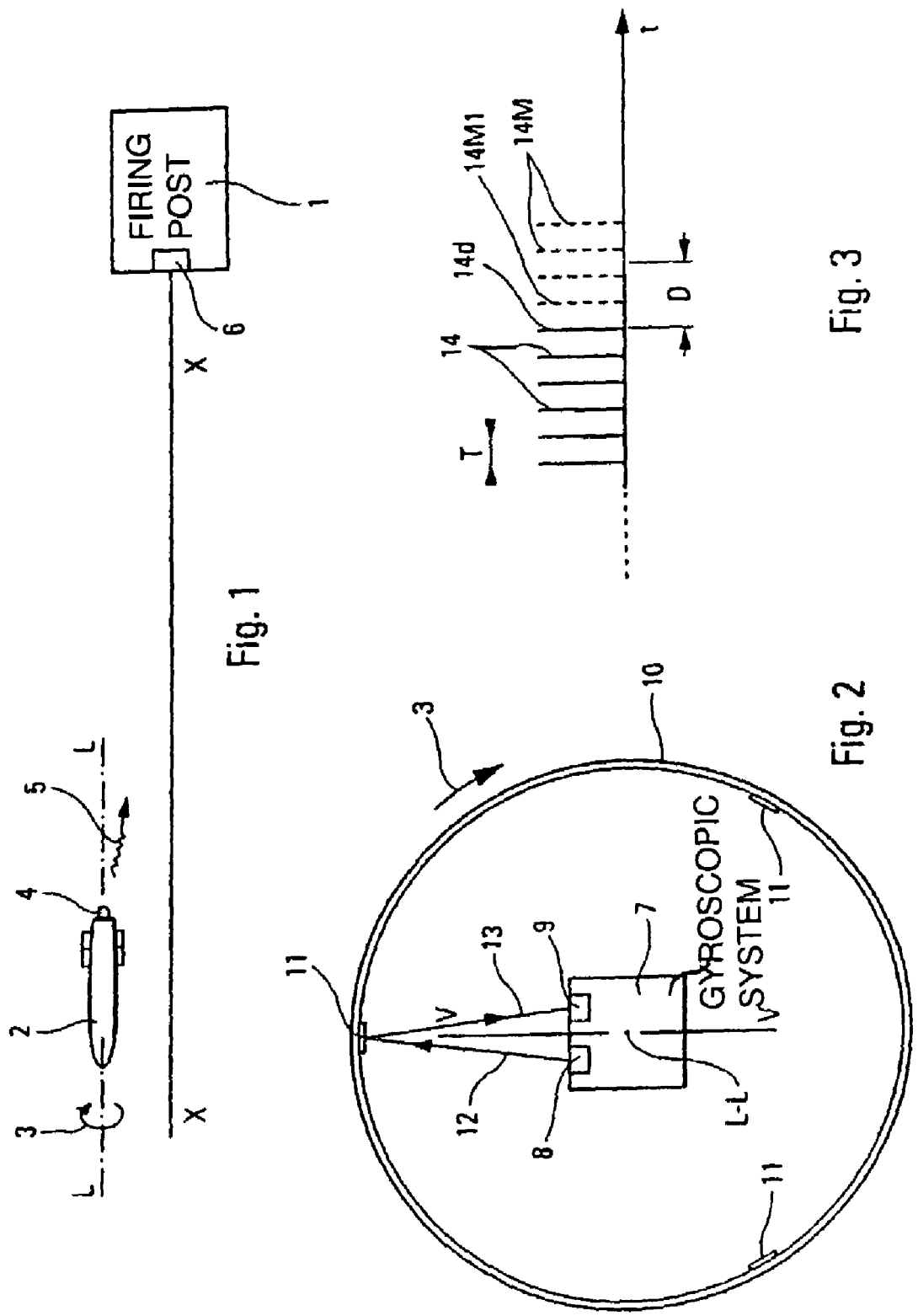

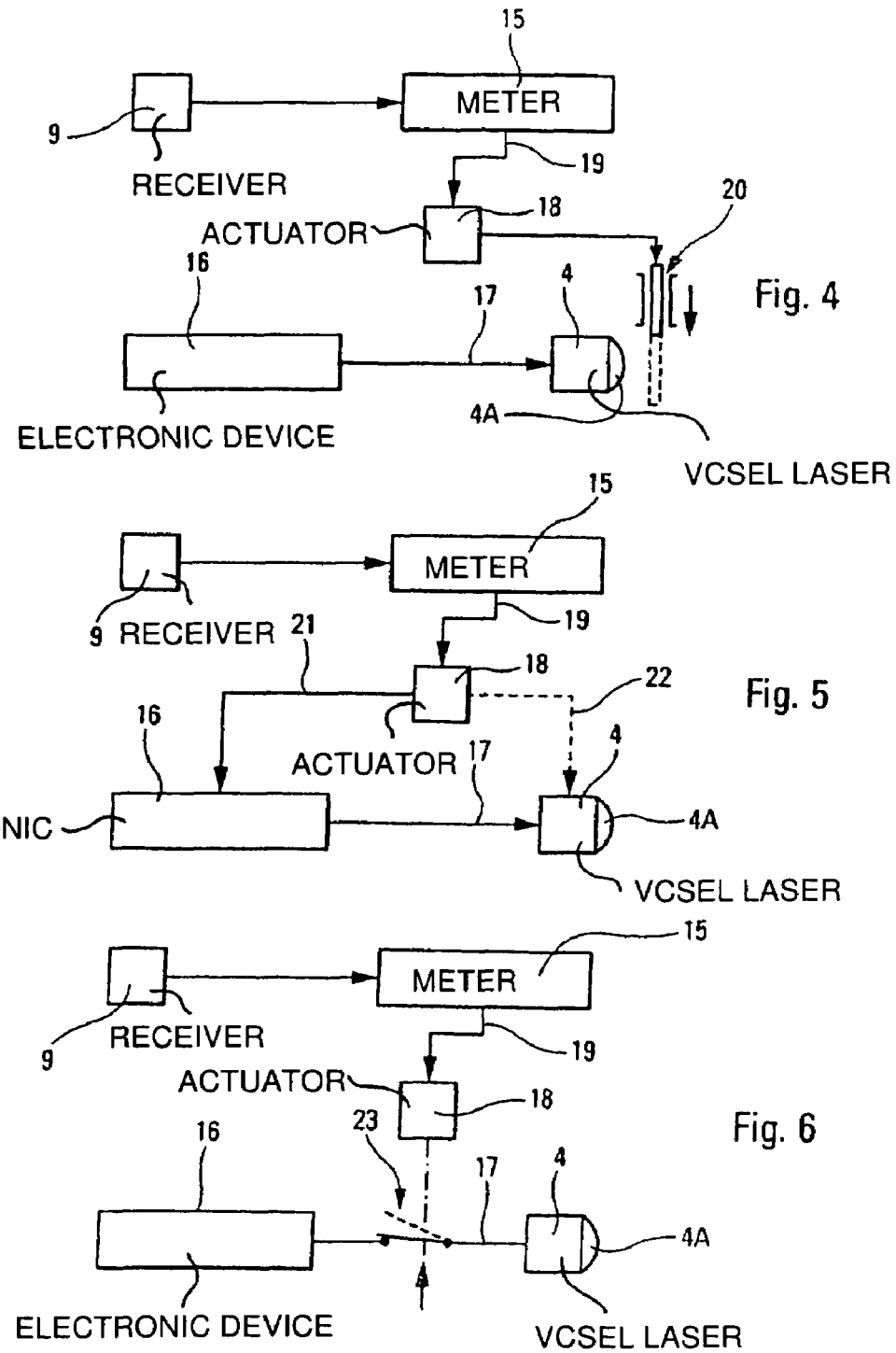

ROTATING MISSILE EMITTING LIGHT PULSES

FIELD OF THE INVENTION

The present invention relates to a rotating missile provided with an emitter of light pulses, addressed to a receiver disposed at a fixed post (the firing post of said missile) and able to serve in the location and guiding of said missile, as is for example described in document U.S. Pat. No. 4,710,028 (FR-2 583 523).

BACKGROUND OF THE RELATED ART

It is known that such an emitter can comprise a voluminous flash lamp consuming significant energy, or else, preferably, a laser source. However, in the latter case, the laser energy emitted must be significant in order to ensure a long-range optical link resistant to possible jamming. This therefore results in significant ocular risks to the operators of said missiles, especially in the eventuality that the missile, for example following a motor fault occurring immediately after the firing thereof, were to fall to the ground in the vicinity of the firing post where said receiver and said operators are situated.

SUMMARY OF THE INVENTION

The present invention is aimed at remedying this drawback.

To this end, according to the invention, the missile provided with an emitter of light pulses addressed to a receiver disposed at a fixed post, said missile receding from said receiver while being impressed with a rotational motion about its longitudinal axis, is noteworthy in that it comprises means for interrupting said light pulses when said rotational motion of said missile stops.

Thus, by virtue of the invention, since, when said missile falls to the ground, its rotation is no longer possible, there is no longer any ocular risk to the operators of the missile in case of premature and accidental landing of the latter in the vicinity of the firing post.

Said means for interrupting the light pulses may act in various ways. For example, they may mask said emitter. However, preferably, they halt the operation of said emitter, either by direct action on it, or by indirect action. In the latter case, when the said emitter is controlled by an electronic control device, said means of interruption may disable either said device, or the control link between said electronic control device and said emitter.

In the case where, in a known manner, said missile comprises a roll detector emitting roll pulses each of which corresponds to a specific angular position of said missile about its longitudinal axis, it is advantageous for said roll detector to control said means for interrupting the light pulses.

Preferably, said means of interruption interrupt said light pulses with delay with respect to the detection of the first missing roll pulse. For example, this interruption occurs after a duration corresponding to at least two periods of the roll pulses, said duration being metered starting from the last roll pulse detected by said detector.

In an advantageous embodiment, said means for interrupting said light pulses comprise a systematic meter permanently metering at a higher frequency than the frequency of said roll pulses, said systematic meter being reset to zero and reinitialized by each roll pulse that it receives, whereas, in case of absence of roll pulse, said systematic meter emits a signal after metering up to a predetermined number, starting from the last roll pulse received.

BRIEF DESCRIPTION OF THE DRAWINGS

The figures of the appended drawing will elucidate the manner in which the invention may be embodied. In these figures, identical references denote similar elements.

FIG. 1 diagrammatically illustrates the guiding of a rotating missile from a fixed firing post.

FIG. 2 diagrammatically shows a roll detector for the missile of FIG. 1.

FIG. 3 is a chart diagrammatically showing, as a function of time t, the sequence of roll pulses generated by the detector of FIG. 2.

FIGS. 4 to 6 are schematic diagrams respectively illustrating three variant embodiments of the device for interrupting the light pulses emitted by a missile, in accordance with the present invention.

DETAILED DESCRIPTION OF THE INVENTION

Represented diagrammatically in FIG. 1 is a firing post 1, able to guide a missile 2 with respect to a reference axis X-X (line of aim). The missile 2 recedes from the firing post 1 while being impressed with a rotational motion about its longitudinal axis L-L. This rotational motion has a speed Vr of for example 5 to 10 revolutions per second and is symbolized by the arrow 3. The missile 2 carries a laser emitter 4, for example a VCSEL laser or laser diode emitter 4A (see FIGS. 4 to 6), able to emit laser pulses 5 toward the firing post 1. The latter comprises a receiver 6 for receiving said laser pulses 5.

As shown diagrammatically in FIG. 2, inside the missile 2 is provided a gyroscopic system 7, defining a fixed direction V-V. On this gyroscopic system 7 of fixed orientation are fixed a light source 8 and a corresponding receiver 9. Furthermore, around the gyroscopic system 7 is provided an envelope 10, tied to the missile 2 in its rotation about the axis L-L. This envelope 10 carries several point-like reflecting surfaces 11, able to receive the incident light beam 12 emitted by the source 8 and to address the corresponding reflected beam 13 onto the receiver 9. The reflecting surfaces 11 are regularly distributed around the envelope 10, for example every 120° (as represented) or every 45°.

Thus, each time a reflecting surface 11 cuts the incident beam 12, the receiver 9 receives a light pulse, which it transforms into an electrical roll pulse 14 and, with each revolution of the missile 2 about its longitudinal axis L-L, are generated as many electrical roll pulses 14 as the envelope 10 comprises reflecting surfaces 11. Of course, the period T between two successive pulses 14 is equal to T=1/Vrxn, Vr being the speed of rotation of the missile 2 about itself (as mentioned above) and n being the number of reflecting surfaces (see FIG. 3).

Furthermore, as shown in FIGS. 4 to 6, the receiver 9 is connected to a meter 15, while the laser emitter 4 is controlled by the electronic device 16, to which it is connected by a link 17. The meter 15 systematically meters at a higher frequency than the frequency 1/T of the roll pulses 14 and it is reset to zero and reinitialized by each of said roll pulses 14 that it receives from the receiver 9.

Thus, while the missile 2 is rotating about its axis L-L, the meter 15 is permanently reset to zero and reinitialized by the successive roll pulses 14.

On the other hand, if the missile 2 ceases rotating about its axis L-L, for example because it has touched the ground, the roll pulses 14 disappear and the meter 15 meters starting from the last roll pulse 14d received—without being reset to zero or reinitialized by any pulse 14—up to a predetermined number corresponding to a duration D greater than the time T separating the last pulse 14*d* received from the first, referenced 14M1, of the missing pulses 14, referenced 14M in FIG. 3. As is represented in FIG. 3, the duration D is preferably greater than 2T.

When this predetermined number is metered by the systematic meter 15, the latter addresses a control signal to means of actuation 18, by way of a link 19.

Upon receipt of this latter control signal, said means of actuation 18 interrupt the emission of the laser pulses 5 by controlling:

- either a flap 20, which masks the laser diode or the VCSEL laser 4A (FIG. 4);
- or the halting of the electronic control device 16 through a link 21 or the halting of the emitter 4 through a link 22 (FIG. 5);
- or else the opening of an interrupter 23 disposed in the link 17 between the electronic control device 16 and the emitter 4 (FIG. 6).

The invention claimed is:

1. A missile provided with an emitter of light pulses addressed to a receiver disposed at a fixed post, said missile receding from said receiver while being impressed with a rotational motion about its longitudinal axis (L-L), said missile further including a light interruption section for interrupting said light pulses when said rotational motion of said missile stops.

2. The missile as claimed in claim 1, wherein said light interrupting section masks the light pulses.

3. The missile as claimed in claim 1, wherein said light interrupting section halts the operation of said emitter.

4. The missile as claimed in claim 3, wherein said emitter is controlled by an electronic control device, and said light interrupting section halts the operation of said electronic control device.

5. The missile as claimed in claim 3, wherein said emitter is controlled by an electronic control device, and said light interrupting section disables the control link between said electronic device and said emitter.

6. The missile as claimed in claim 1, further comprising a roll detector for said missile emitting roll pulses each of which corresponds to a specific angular position of said missile about said longitudinal axis (L-L), wherein said roll detector controls said light interrupting section.

7. The missile as claimed in claim 6, wherein said light interrupting section interrupts the light pulses with delay with respect to the detection of a first missing roll pulse.

8. The missile as claimed in claim 7, wherein said light interrupting section interrupts the light pulses after a duration (D) corresponding to at least two periods (T) of said roll pulses, said duration being metered from a last roll pulse detected by said roll detector.

9. The missile as claimed claim 6, wherein said light interrupting section comprises a systematic meter permanently metering at a higher frequency than the frequency of said roll pulses, said systematic meter is reset to zero and reinitialized by each roll pulse that it receives and, in case of absence of a roll pulse, said systematic meter emits a signal after metering up to a predetermined number, starting from a last roll pulse received.

* * * * *